United States Patent
McGlaun et al.

(10) Patent No.: US 9,272,777 B2
(45) Date of Patent: Mar. 1, 2016

(54) HELICOPTER GEARBOX AUXILIARY COOLING SYSTEM

(71) Applicant: BELL HELICOPTER TEXTRON INC., Fort Worth, TX (US)

(72) Inventors: Monte A. McGlaun, Abilene, TX (US); K. Myron Jackson, Euless, TX (US)

(73) Assignee: Textron Innovations Inc., Providence, RI (US)

( * ) Notice: Subject to any disclaimer, the term of this patent is extended or adjusted under 35 U.S.C. 154(b) by 485 days.

(21) Appl. No.: 13/661,269

(22) Filed: Oct. 26, 2012

(65) Prior Publication Data

US 2014/0116654 A1 May 1, 2014

(51) Int. Cl.
| | |
|---|---|
| *B60H 1/00* | (2006.01) |
| *B64C 27/12* | (2006.01) |
| *F28D 15/02* | (2006.01) |
| *F16H 57/04* | (2010.01) |
| *B64D 33/08* | (2006.01) |
| *F28D 21/00* | (2006.01) |

(52) U.S. Cl.
CPC ............... *B64C 27/12* (2013.01); *B64D 33/08* (2013.01); *F16H 57/0417* (2013.01); *F16H 57/0471* (2013.01); *F16H 57/0479* (2013.01); *F28D 15/0208* (2013.01); *F28D 2021/0021* (2013.01)

(58) Field of Classification Search
CPC ............ F28D 15/02; F28D 15/04; F28F 7/00; B64D 33/08; B64C 27/04; B64C 27/12
USPC ............. 165/41, 86, 104.25, 80.4; 244/17.11, 244/57, 53 R
See application file for complete search history.

(56) References Cited

U.S. PATENT DOCUMENTS

| | | | | |
|---|---|---|---|---|
| 3,801,843 | A | * | 4/1974 | Corman et al. ................. 310/52 |
| 4,118,646 | A | * | 10/1978 | Fleming et al. ................. 310/58 |
| 4,805,690 | A | * | 2/1989 | Minami et al. ................. 165/89 |
| 5,119,886 | A | * | 6/1992 | Fletcher et al. ................. 165/89 |
| 5,123,479 | A | | 6/1992 | Pravda |
| 5,240,069 | A | * | 8/1993 | Yerkes ........................... 165/86 |
| 6,439,298 | B1 | * | 8/2002 | Li ............................ 165/104.33 |

(Continued)

FOREIGN PATENT DOCUMENTS

| | | |
|---|---|---|
| CA | 2767446 A1 | 3/2013 |
| EP | 2725262 A | 4/2014 |

(Continued)

OTHER PUBLICATIONS

Office Action dated Nov. 4, 2014 from counterpart CA App. No. 2,828,643.

(Continued)

*Primary Examiner* — Leonard R Leo
*Assistant Examiner* — Gustavo Hincapie Serna
(74) *Attorney, Agent, or Firm* — James E. Walton (57) ABSTRACT

A cooling system using one or more heat pipes rotating about a central axis to transfer heat energy from one medium to another. The heat pipes are oriented within a rotating member such that the axis of the heat pipe is non-coaxial with that of a central axis of the rotating member. Centrifugal forces are used to assist the movement of the working fluid within the heat pipe. The cooling system also includes heat pipes associated with a planetary carrier assembly and supplemental heat exchangers for use in aircraft and other machinery.

12 Claims, 10 Drawing Sheets

(56) References Cited

U.S. PATENT DOCUMENTS

| | | | |
|---|---|---|---|
| 6,830,096 B1* | 12/2004 | Fett et al. ..................... 165/41 |
| 6,892,800 B2* | 5/2005 | Mok ..................... 165/104.33 |
| 7,168,480 B2* | 1/2007 | Jankowski et al. ...... 165/104.26 |
| 7,398,641 B2* | 7/2008 | Stretton et al. ............. 60/39.093 |
| 2003/0150598 A1* | 8/2003 | Lee et al. ..................... 165/80.4 |
| 2007/0113583 A1 | 5/2007 | Chung |
| 2008/0023177 A1* | 1/2008 | Hassett et al. ........... 165/104.33 |
| 2009/0178785 A1 | 7/2009 | Hassett et al. |
| 2009/0250197 A1 | 10/2009 | Hassett et al. |

FOREIGN PATENT DOCUMENTS

| | | | |
|---|---|---|---|
| FR | 2288960 A1 | 5/1976 |
| JP | 49128354 A | 12/1974 |
| JP | 55075183 A | 6/1980 |
| JP | 56129644 U | 10/1981 |
| JP | 58019691 A | 2/1983 |

OTHER PUBLICATIONS

European Search Report from European Patent Office in related European application No. 12195350, mailed Mar. 26, 2013, 8 pages.

Extended European Search Report in related European patent application 12195350.9, mailed Mar. 26, 2013, 8 pages.

Office Action dated Sep. 1, 2014 from counterpart EP App. No. 13150077.9.

"Evaluation of Heat Pipe Cooled Helicopter Engine and Gearbox Bearings under Oil-Starved Conditions", SKF Industries Inc King of Prussia PA, Jul. 1975, 192 pages (particularly pp. 26-32).

Office Action dated Dec. 1, 2014 from counterpart CA App. No. 2,833,050.

* cited by examiner

HELICOPTER GEARBOX AUXILIARY COOLING SYSTEM

BACKGROUND

1. Field of the Invention

The present application relates generally to the removal of heat from a helicopter gearbox and, more particularly, to use of heat pipes within the gearbox.

2. Description of Related Art

Aircraft drivetrains include various components that produce and transfer power. For example, engines and gearboxes are common components. Such components generate heat and require lubrication. Excessive levels of heat can cause premature failure and create safety risks. Proper lubrication serves to reduce heat production and assist in heat removal from within moving components.

Typically, aircraft use a variety of primary lubrication systems to provide wear protection and control heat transfer within components. Under normal operating conditions, primary lubrication systems provide proper lubrication and heat removal. However, in cases of emergency, primary lubrication systems can fail resulting in excessive wear and failure of components, such as a gearbox or transmission.

Aircraft are generally required to maintain manageable flight operations for selected durations of time if the primary lubrication system fails (zero pressure). One method used to satisfy the requirements of manageable flight during an emergency is to increase the amount of lubricant reserves and increase the weight of the lubricant. Another method is to use a secondary lubrication system to operate when the primary lubrication system fails. Although not commonly used, secondary systems typically provide only sufficient lubricant to lubricate moving parts but fail to adequately remove heat. Both methods increase the overall weight of the aircraft and fail to remove adequate amounts of heat. An improved method of controlling heat transfer from an aircraft is required.

Heat pipes are a device commonly used to transfer heat. Heat pipes are a transfer mechanism that can transport large quantities of heat with a very small difference in temperature between hot and cold interfaces. However, heat pipes are typically used in static environments and experience design limitations from difficulties in moving a working fluid between a condenser end and an evaporator end. External forces, such as gravitational and centrifugal forces, can hinder performance of the heat pipe.

Although great strides have been made in managing heat transfer in aircraft, considerable shortcomings remain.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

While the system and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
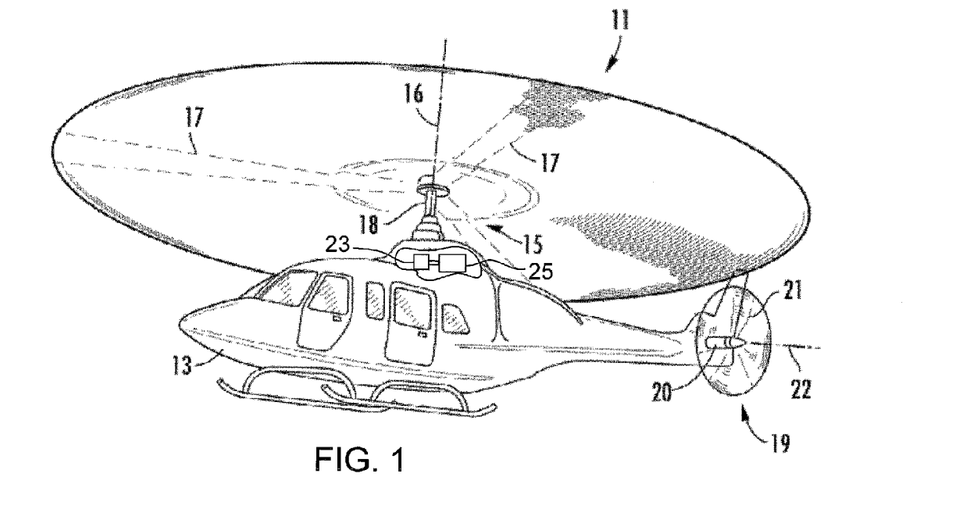
FIG. 1 is a perspective view of a helicopter using a cooling system in the drivetrain according to the preferred embodiment of the present application.

Referring to FIG. 1 in the drawings, a helicopter 11 according to the present application is illustrated. Helicopter 11 has a fuselage 13 and a main rotor assembly 15, including main rotor blades 17 and a main rotor mast 18. Helicopter 11 has a tail rotor assembly 19, including tail rotor blades 21 and a tail rotor mast 20. Main rotor blades 17 generally rotate about a vertical axis 16 of main rotor mast 18. Tail rotor blades 21 generally rotate about a lateral axis 22 of tail rotor mast 20. Helicopter 11 also includes a cooling system according to the present application for removing heat within the drivetrain of helicopter 11. The cooling system utilizes heat pipes configured to remove heat from a first medium in communication with the drivetrain to a second medium in communication with the drivetrain. Transmission 23 includes the cooling system of the present application. Transmission 23, also known as a gearbox, is mechanically coupled between engine 25 and main rotor assembly 15. It is understood that the cooling system may be used in other locations within helicopter 11. Furthermore, the cooling system may be used in other applications outside of aircraft.

Figure 2:
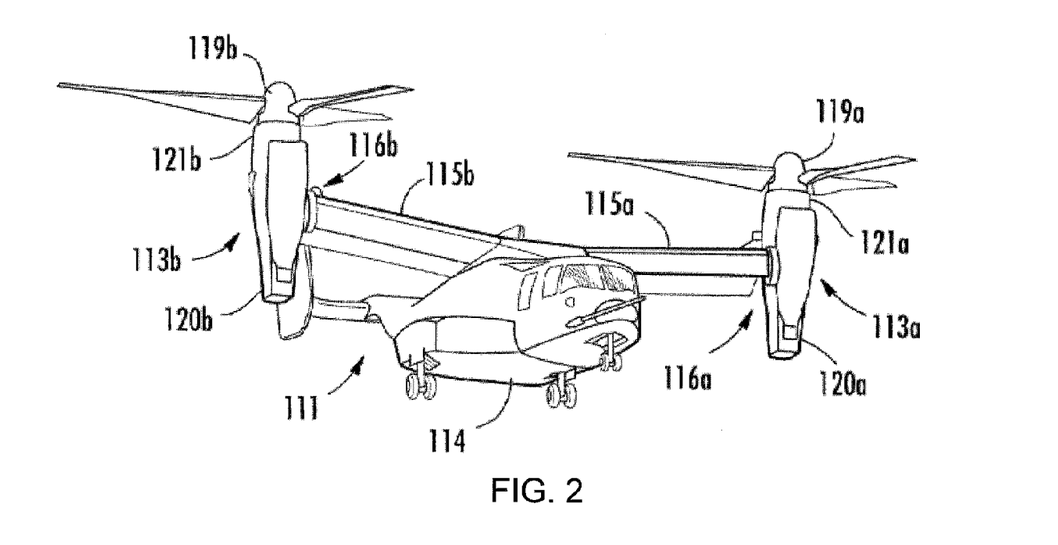
FIG. 2 is a tilt rotor aircraft using the cooling system of FIG. 1.

The cooling system of the present application may also be utilized on other types of rotary wing aircraft. Referring now to FIG. 2 in the drawings, a tilt rotor aircraft 111 according to the present application is illustrated. As is conventional with tilt rotor aircraft, rotor assemblies 113a and 113b are carried by wings 115a and 115b, and are disposed at end portions 116a and 116b of wings 115a and 115b, respectively. Tilt rotor assemblies 113a and 113b include nacelles 120a and 120b, which carry the engines and transmissions of tilt rotor aircraft 111, as well as, rotor hubs 119a and 119b on forward ends 121a and 121b of tilt rotor assemblies 113a and 113b, respectively.

Tilt rotor assemblies 113a and 113b move or rotate relative to wing members 115a and 115b between a helicopter mode in which tilt rotor assemblies 113a and 113b are tilted upward, such that tilt rotor aircraft 111 flies like a conventional helicopter; and an airplane mode in which tilt rotor assemblies 113a and 113b are tilted forward, such that tilt rotor aircraft 111 flies like a conventional propeller driven aircraft. In FIG. 2, tilt rotor aircraft 111 is shown in the helicopter mode. As shown in FIG. 2, wings 115a and 115b are coupled to a fuselage 114. Tilt rotor aircraft 111 also includes a cooling system according to the present application for managing the heat transfer within mechanical components of the aircraft drive train.

It is understood that helicopter 11 and tiltrotor aircraft 111 are both aircraft. The term aircraft is not so narrow as to be limited by these types of aircraft. For purposes of this application, aircraft may include any machine supported for flight in the air, by buoyancy, or by the dynamic action of air on its surfaces. Examples of possible aircraft include powered airplanes, gliders, tiltrotors, and rotorcraft such as helicopters and compound helicopters. Therefore the term "aircraft" will relate to rotorcraft 101, tiltrotor aircraft 111, and all other forms of aircraft.

Figure 3:
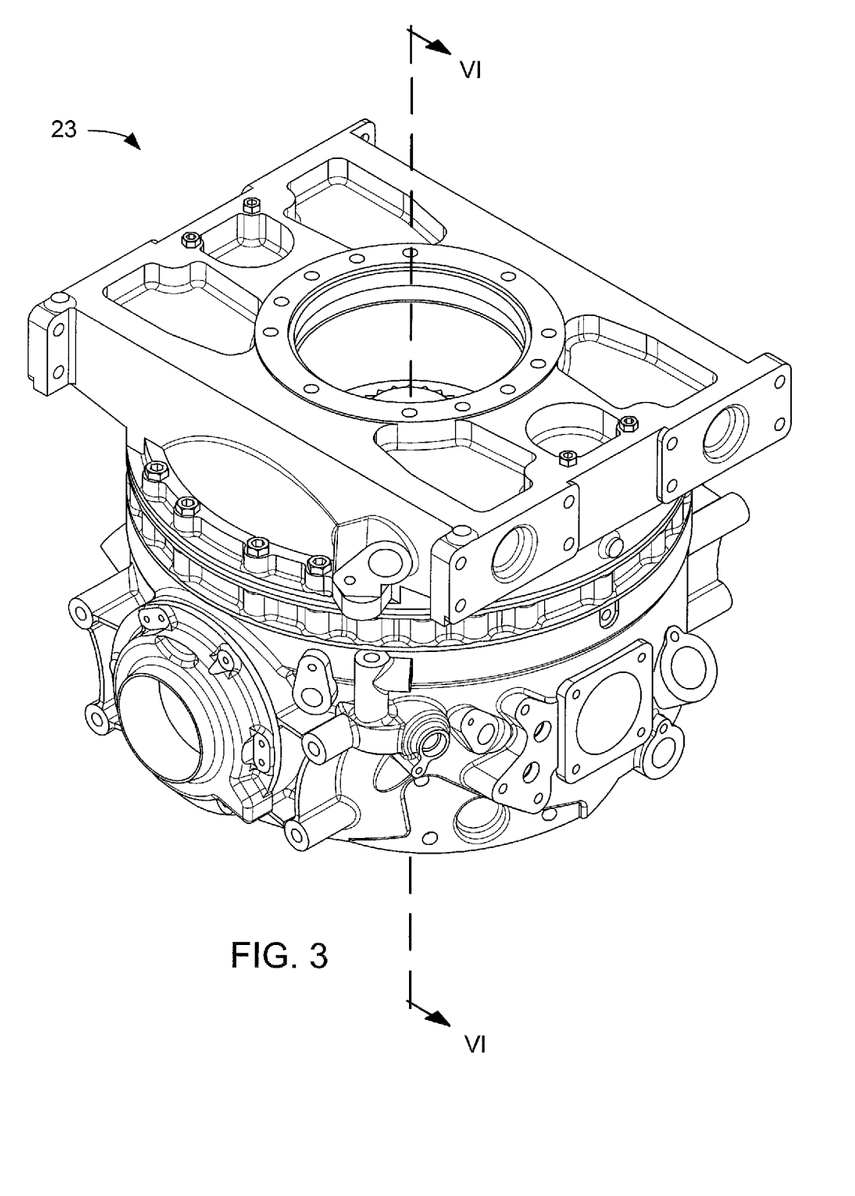
FIG. 3 is a perspective view of a transmission used in the drivetrain of FIG. 1.
Figure 4:
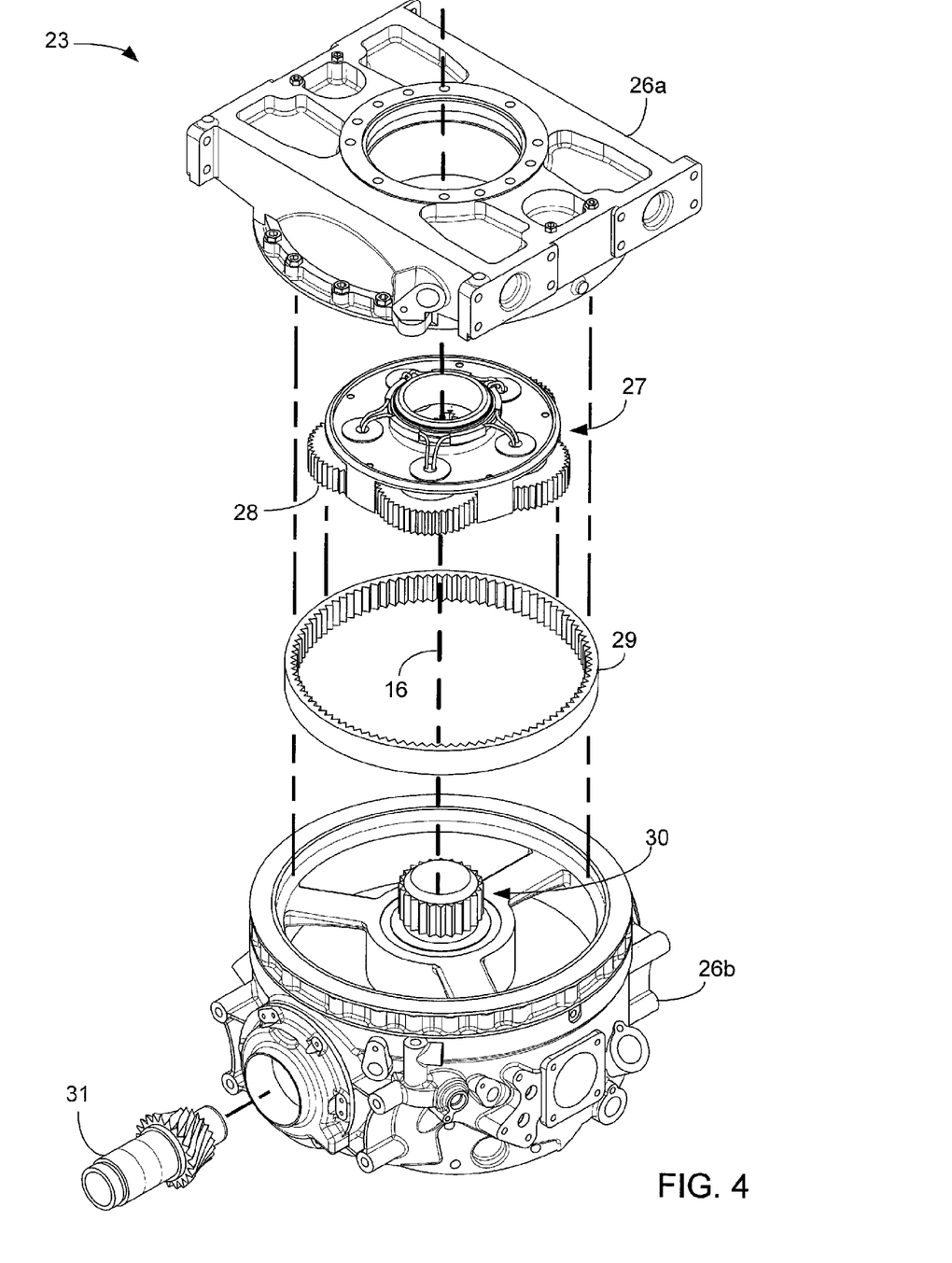
FIG. 4 is an exploded view of selected components of the transmission of FIG. 3, including a planetary carrier assembly for use in the cooling system of FIG. 1.
Figure 5:
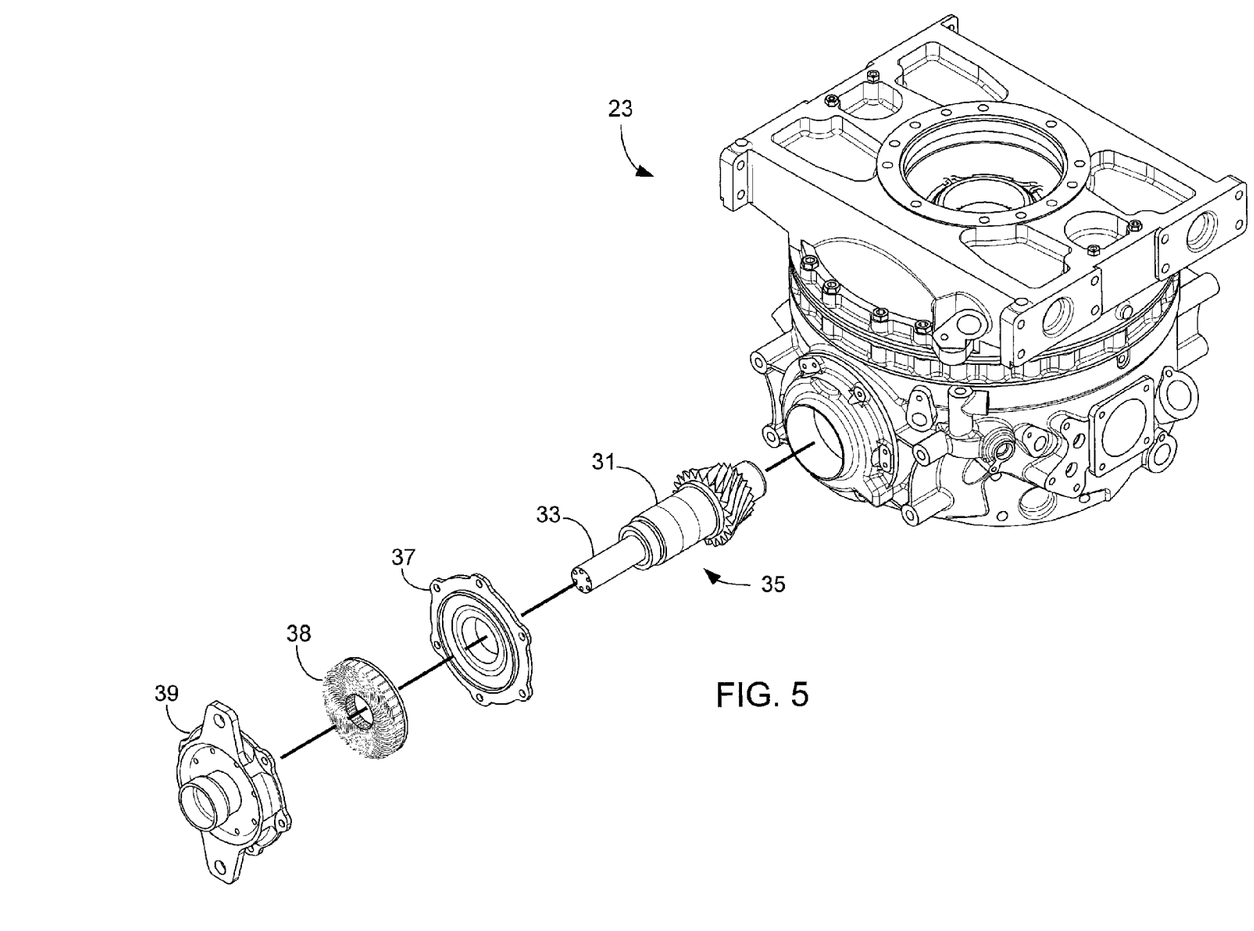
FIG. 5 is an exploded view of a drive linkage used to engage the transmission, the drive linkage forming part of the cooling system of FIG. 1.

Referring now also to FIGS. 3-5 in the drawings, an isometric view of transmission 23, used within the cooling system of the present application, is illustrated in FIG. 3. FIG. 3 is a representative embodiment of a transmission that may be configured to use the cooling system of the present application. It is understood that other styles and sized transmissions may also be used. FIG. 4 shows an exploded view of selected components within transmission 23. Transmission 23 includes an upper housing 26a and a lower housing 26b that couple together to form a single unitary housing configured to encompass internal components. Internal components may include at least a planetary carrier assembly 27 having planetary pinions 28, a planetary ring gear 29, a planetary sun gear 30, and an input shaft 31. Although described with specific internal components, it is understood that transmission 23 may function with and utilize any number of selected components other than those depicted and described. For simplicity, other internal components within transmission 23 were not depicted. It is understood that different embodiments of transmission 23 may utilize either a plurality of planetary carrier assemblies 27, or may refrain from using any planetary carrier assemblies 27 depending on the configuration.

Lower housing 26b, planetary ring 29, planetary carrier assembly 27 and upper housing 26a are each configured to accept main rotor mast 18 along vertical axis 16. It is understood that vertical axis 16 is not limited in orientation to that of being vertical. Other orientations are possible depending on the type of aircraft and power train configuration. Input shaft 31 is a portion of drive linkage interconnecting engine 25 and transmission 23.

Transmission 23 is configured to receive mechanical energy from engine 25 via a rotating member called an input adapter 37, as seen in FIG. 5. Input adapter 37 is inserted onto input shaft 31 to form an input drive quill 35. Input drive quill 35 is operably coupled at one end to engine 25 and at the other end within transmission 23. As engine 25 rotates input adapter 37, and therefore input drive quill 35, input shaft 31 rotates within transmission 23. Transmission 23 is configured to utilize this rotational energy to rotate main rotor shaft 18. Other members of the drive linkage interconnecting engine 25 and transmission 23 is a driveshaft adapter 39. A mandrel assembly 33 is inserted within a hollow cavity of input shaft 31. Mandrel assembly 33 is included within input drive quill 35 and is configured to transfer heat energy generated within transmission 23.

Figure 6:
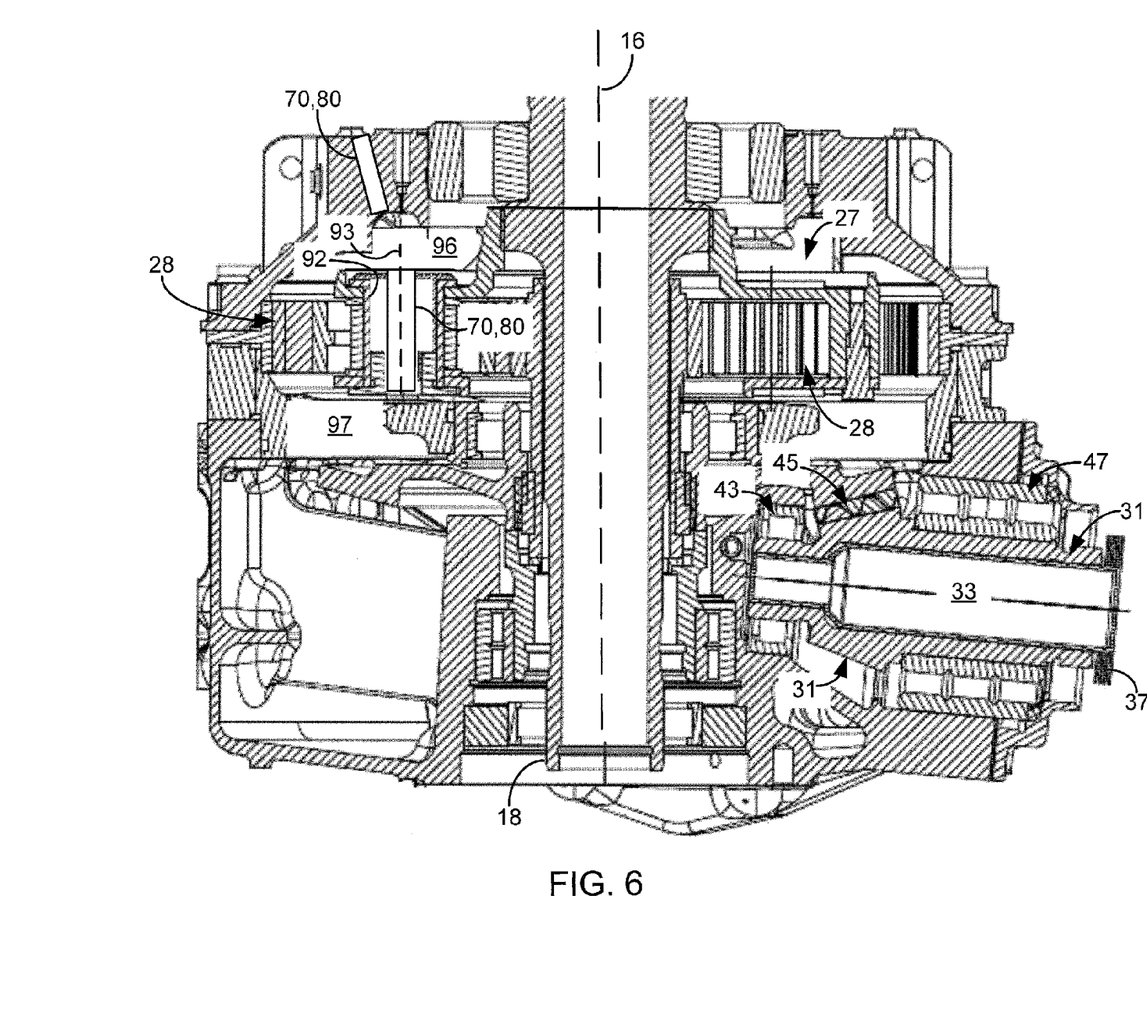
FIG. 6 is a section view of the transmission of FIG. 3 along the lines VI-VI, the transmission having the planetary carrier assembly and a mandrel assembly used in the cooling system of FIG. 1.

Referring now also to FIG. 6 in the drawings, a section view of transmission 23 is illustrated. Heat is generated by the gears and bearings within transmission 23 and is conducted through the steel gears and shafts. The gears and bearings surrounding input shaft 31, namely a nose roller bearing 43, a spiral bevel gear 45 used to engage the teeth of input shaft 31, and a triplex bearing 47, produce a significant amount of the heat within a transmission. Furthermore, the areas surrounding planetary carrier assembly 27 also account for a significant amount of the heat generated within a transmission. Lubrication systems are used to decrease friction and to remove heat from transmission 23. However, lubrication systems are susceptible to failure, resulting in a transmission operating without lubrication and without the ability to remove heat generated. Internal components can fail if not cooled or lubricated sufficiently by the lubrication system.

The cooling system of the present application includes a passive heat removal system that is configured to provide continual heat removal from transmission 23 for a period of time during a "run dry" or emergency condition. A "run dry" condition can exist when the primary pressurized lubrication supply has been terminated (zero pressure) through a system malfunction, battle damage, or the like. During the run dry condition, the cooling system of the present application utilizes one or more heat pipes to provide continual heat removal from components within transmission 23 without active command from a pilot or aircraft control system. The cooling system of the present application is a passive system.

Aircraft regulatory agencies, such as the Federal Aviation Administration (FAA) may require that transmission 23 be operable for a requisite period of time after the primary lubrication system has failed. Such a requirement in aircraft transmissions may be referred to as a "run dry" capability requirement. Therefore, aircraft are required to maintain manageable flight operations for selected durations of time if the primary lubrication system fails (zero pressure). The primary lubrication system refers to the lubrication system or systems within the transmission of the aircraft. The cooling system of the present application is configured to maintain manageable flight operations of the aircraft for a selected duration in accordance with the "run dry" capability requirement. For example, the cooling system of the present application is configured to prevent failure of transmission 23 due to heat build-up for a specified time (possibly thirty minutes) after failure of the primary lubrication system. It is understood the time period may be lengthened or shortened. Manageable flight operations refer to a degree of control a pilot has over the flight controls and drivetrain of an aircraft to sufficiently and safely land the aircraft. Transmission 23, when equipped with the cooling system of the present application, is configured to operate during a loss of lubrication event for the duration of the time period prior to failure of transmission 23.

Transmission 23 uses hollow shafts and gears to transfer power. The shafts and gears typically have one or more hollow sections or bores to reduce weight. Transmission 23, with the cooling system of the present application, is configured to place uniquely designed, light weight heat pipes into hollow shafts and gears for the purpose of improving heat removal afforded by primary lubrication systems. The cooling system may act in combination with the primary lubrication system or independently, such as in times when the lubrication system fails. To accomplish this, the cooling system includes mandrel assembly 33 and/or planetary carrier assembly 27, and/or supplemental heat exchangers (see FIGS. 12-14).

Figures 7, 8:
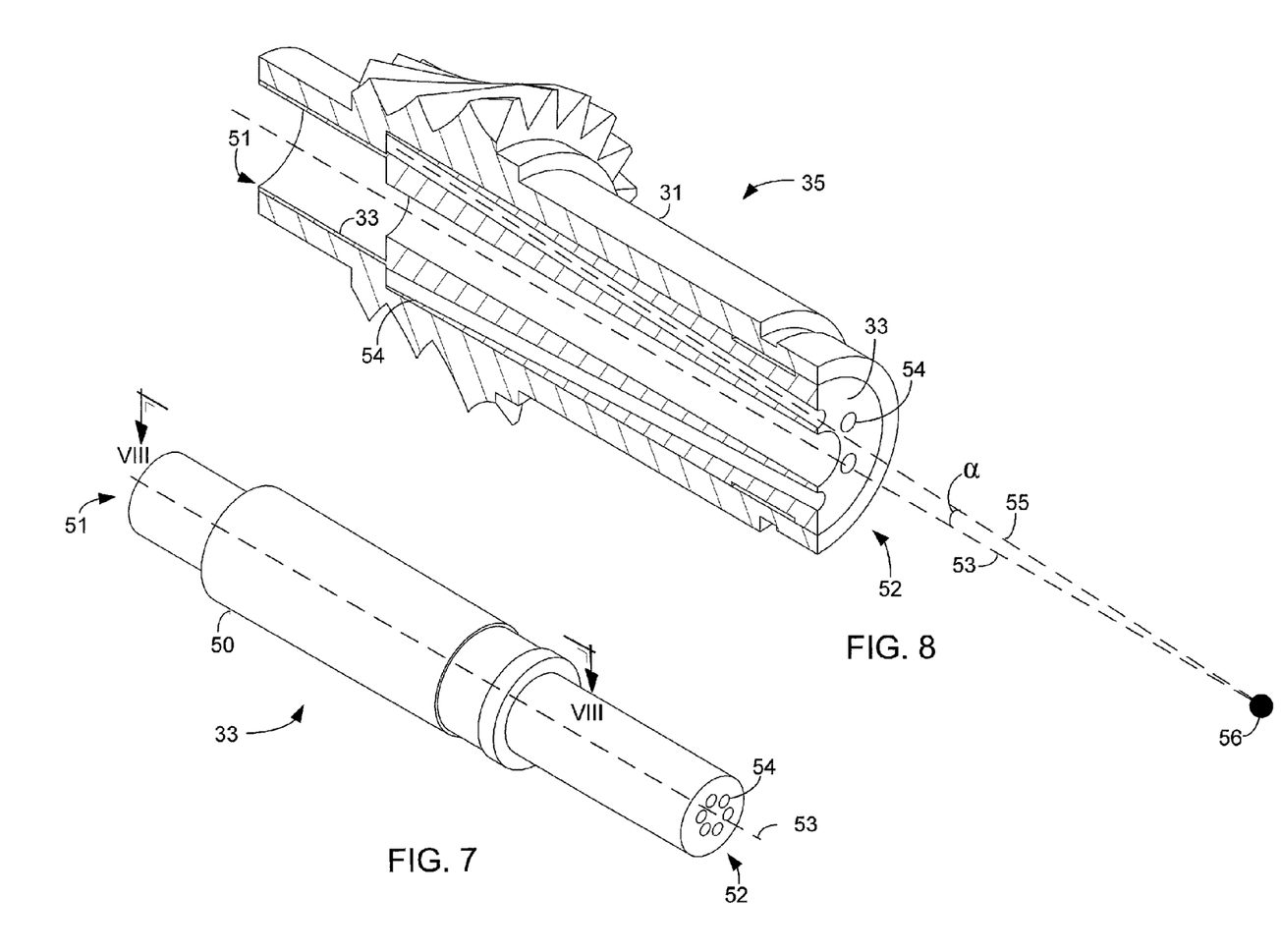
FIG. 7 is an isometric view of the mandrel assembly used in the cooling system of FIG. 1.
FIG. 8 is a partial section view of the mandrel assembly of FIG. 7 coupled within an input quill.

Referring now also to FIGS. 7 and 8 in the drawings, mandrel assembly 33 is illustrated. Mandrel assembly 33 includes at least a rotating member or body 50, one or more channels 54 formed within rotating member 50, and at least one heat pipe 70 (see FIG. 9) secured within channel 54. Mandrel assembly 33 is configured to transfer heat energy between two mediums by efficiently utilizing available space within body 50 to house one or more heat pipes. The heat pipes are uniquely oriented with respect to body 50 to permit centrifugal loads to assist in the movement of the working fluid from a condenser end to an evaporator end of the heat pipe.

FIG. 7 is an isometric view of mandrel assembly 33. Mandrel assembly 33 has a first end 51 and a second end 52. First end 51 engages input shaft 31 and is inserted within transmission 23 during operation. Body 50 maintains a general cylindrical shape of varied diameters, defining a central axis 53. Body 50 is configured to have one or more channels 54 extending between first end 51 and second end 52. In the preferred embodiment, channels 54 are symmetrically aligned about central axis 53. Channels 54 are sequentially spaced about central axis 53 in a radial pattern and are configured to accept one or more heat pipes each. Maintenance of a symmetric pattern assists in maintaining the balance of mandrel assembly 33 during rotation. Although depicted having a total of six channels in FIG. 7, it is understood that mandrel assembly 33 may have one or more channels 54. Where a single channel 54 is used, channel 54 is located coaxial to central axis 53.

As seen in particular with FIG. 8, channels 54 are hollow passageways formed within the interior of body 50. Each channel 54 defines a channel axis 55. Channel axis 55 and central axis 53 are orientated in a non-coaxial manner, such that channel axis 55 and central axis 53 form an angle $\alpha$ at an intersection 56 adjacent second end 52. In the preferred embodiment, the portion of channel 54 adjacent second end 52 is closer to central axis 53 than the portion of channel 54 adjacent first end 51. Other embodiments may switch the misaligned orientation such that intersection 56 of channel axis 55 and central axis 53 is adjacent first end 51. Although depicted as utilizing linear cylindrical channels 54, it is understood that other embodiments may permit channels of varied shapes and sizes. In such alternative embodiments, the distance between channel axis 55 and central axis 53 would still diverge along the length of body 50 from one end (51, 52) to the other end (51, 52).

The misaligned orientation of channel 54 is important due to how heat pipes function. A typical heat pipe consists of a sealed hollow tube made of a thermally conductive material, e.g., a thermally conductive metal such as copper or aluminum. The heat pipe contains a relatively small quantity of a "working fluid" or coolant (such as water, ethanol or mercury) with the remainder of the heat pipe being filled with a vapor phase of the working fluid, all other gases being substantially excluded. Heat is transferred from an evaporator end of a heat pipe to an opposing condenser end of the heat pipe by a rapid transition of heat vaporized working fluid from the evaporator end to the condenser end.

During operation, heating the evaporator end of the heat pipe will cause the working fluid inside the heat pipe at the evaporator end to turn to vapor, thereby causing a pressure differential in the heat pipe. This pressure difference drives a rapid mass transfer of the heated vaporized working fluid from the evaporator end to the condenser end of the heat pipe where the vapor condenses, thereby releasing its latent heat and heating the condenser end of the heat pipe. The condensed working fluid then flows back to the evaporator end of the heat pipe.

In order for a heat pipe to function, the condensed working fluid must be able to travel from the condenser end to the evaporator end of the heat pipe. Uses of heat pipes can be limited as a result of difficulties in moving the condensed working fluid. External forces, such as gravitational forces, can impede or assist in the movement of the condensed fluid. In the case of heat pipes that are vertically-oriented with the evaporator end down, the fluid movement is assisted by the force of gravity, known as a thermosyphon. For this reason, heat pipes can be the longest when vertically oriented with the evaporator end of the heat pipe below the condenser end. The length of a heat pipe will be most limited when the heat pipe is vertically oriented with the evaporator end of the heat pipe above the condenser end. In this orientation, gravity attracts the condensed fluid to the condenser end of the heat pipe rather than the evaporator end. When horizontal, the maximum heat pipe length will be somewhere between the maximum heat pipe lengths in the two vertical orientations. Wicks are used to return the working fluid to the evaporator end by capillary action as a help in overcoming external forces.

Centrifugal forces are also external forces that can impede or assist in the movement of the condensed fluid. As opposed to static environments where typically only gravitational forces act against the working fluid, the heat pipes in mandrel assembly 33 are configured to overcome gravitational and centrifugal forces while body 50 rotates about central axis 53. The diverging misaligned orientation of channels 54 with respect to central axis 53 allow for external forces to be overcome.

Figure 9:
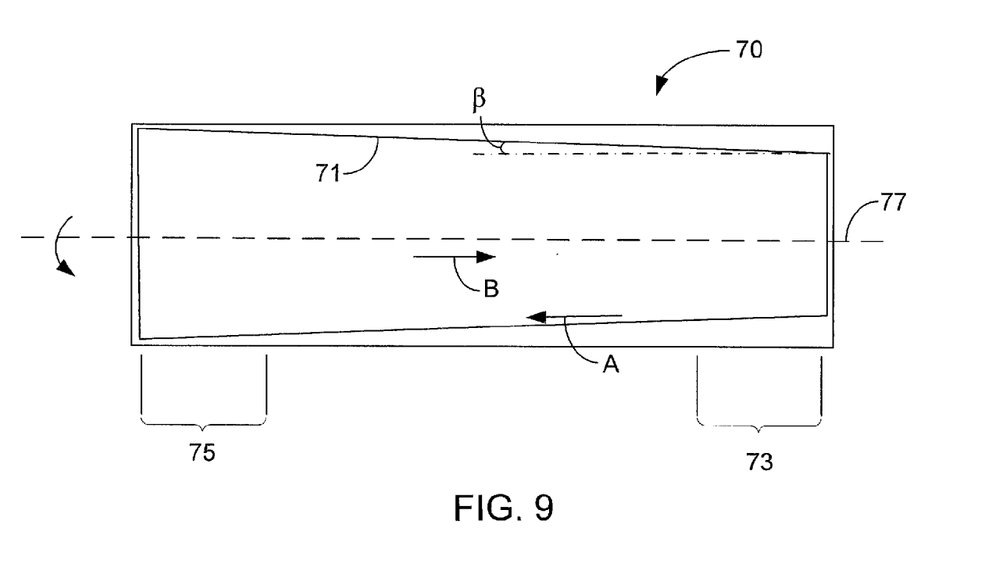
FIG. 9 is a schematic view of a rotating heat pipe used in the cooling system of FIG. 1.
Figure 10:
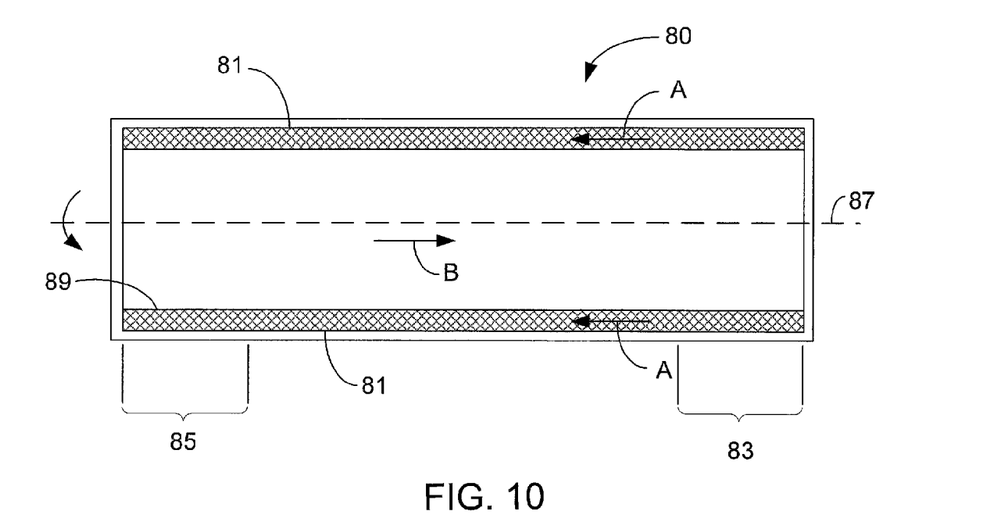
FIG. 10 is a schematic view of an alternative heat pipe with a wick used in the cooling system of FIG. 1.

Referring now also to FIGS. 9 and 10 in the drawings, a schematic of a rotating heat pipe 70 is illustrated. Heat pipes are highly efficient heat removal devices that can conduct heat much more efficiently than steel. Rotating heat pipe 70 assists in the removal of heat generated by bearings and gears during normal flight operation. The heat removed by the heat pipes 70 during normal aircraft operation reduces the required heat removal capacity of the primary lubrication system. Therefore the oil reserve in the primary lubrication system and the weight associated with that oil can be reduced. In addition, heat pipe 70 removes heat from gears and bearings during a loss of lubrication event (i.e., zero oil pressure) allowing the aircraft transmission to function until the aircraft has landed.

Heat generated by the gears and bearings is conducted through the steel gears and shafts to heat pipes, such as rotating heat pipe 70, located in the bore or hollow of the gear or shaft. The heat pipe moves heat from the gear or shaft to the transmission case or directly to the ambient air around the transmission.

Heat pipe 70 is configured to rest within channels 54 of mandrel assembly 33. Heat pipe 70 has a condenser region 73 and an evaporator region 75. In operation, heat energy is received in evaporator region 75 which turns the working fluid into a vapor that travels in the direction of arrow B to condenser region 73. Heat energy is rejected in condenser region 73 turning the working fluid back into a liquid state. The working fluid travels along internal walls 71 back toward evaporator region 75 as noted by arrow A. The internal walls 71 of heat pipe 70 are set at an angle 13 with respect to pipe axis 77. As heat pipe 70 rotates about central axis 53 of mandrel assembly 33, working fluid is forced against internal walls 71. Angle β and α, independently, are sufficiently sized to permit working fluid to translate along internal walls 71 as a result of centrifugal forces. Heat pipe 70 works whether located in a non-coaxial orientation with central axis 53 or in a coaxial orientation with central axis 53.

The non-coaxial orientation of channels 54 with that of central axis 53 permit other types of heat pipes to operate successfully within mandrel assembly 33, see FIG. 10. For example, heat pipe 80 may be used in place of rotating heat pipe 70. Heat pipe 80 is similar in form and function to that of heat pipe 70, except that heat pipe 80 has internal walls 81 that are parallel to heat pipe axis 87. Heat pipe 80 has a condenser region 83 and an evaporator region 85. Heat energy is received in evaporator region 85 which turns the working fluid into a vapor that travels in the direction of arrow B to condenser region 83. Heat energy is rejected in condenser region 83 turning the working fluid back into a liquid state. The working fluid travels along internal walls 81 back toward evaporator region 85 as noted by arrows A. Furthermore, heat pipe 80 also uses an optional wick 89 to aid in the translation of working fluid from condenser region 83 to evaporator region 85.

Heat energy is released from heat pipe 70,80 in condenser region 73. Mandrel assembly 33 is configured to use convective airflow to accelerate the transfer of heat energy and create a heat sink for mandrel assembly 33. One such method is to rely on induced convection from the spinning of body 50. However, airflow over condenser region 73 may be limited. A more preferred method is to increase or generate more directed airflow over condenser regions 73. In generating this convective airflow, a condenser 38 may be used as seen in FIG. 5. In an alternative embodiment, mandrel assembly 33 may include condenser 38. Condenser 38 is one of the drive linkages seen in FIG. 5 and is located between driveshaft adapter 39 and input adapter 37. Condenser 38 has a central aperture configured to accept body 50. Central axis 53 and central aperture are coaxial. Condenser 38 is configured to generate a heat sink for the heat energy by generating a continual flow of air over condenser region 73. Condenser 38 may use one or more fan blades having a plurality of shapes and designs to produce the flow of air. Examples may include a turbo compressor fan or a radial fin stack.

Figure 11:
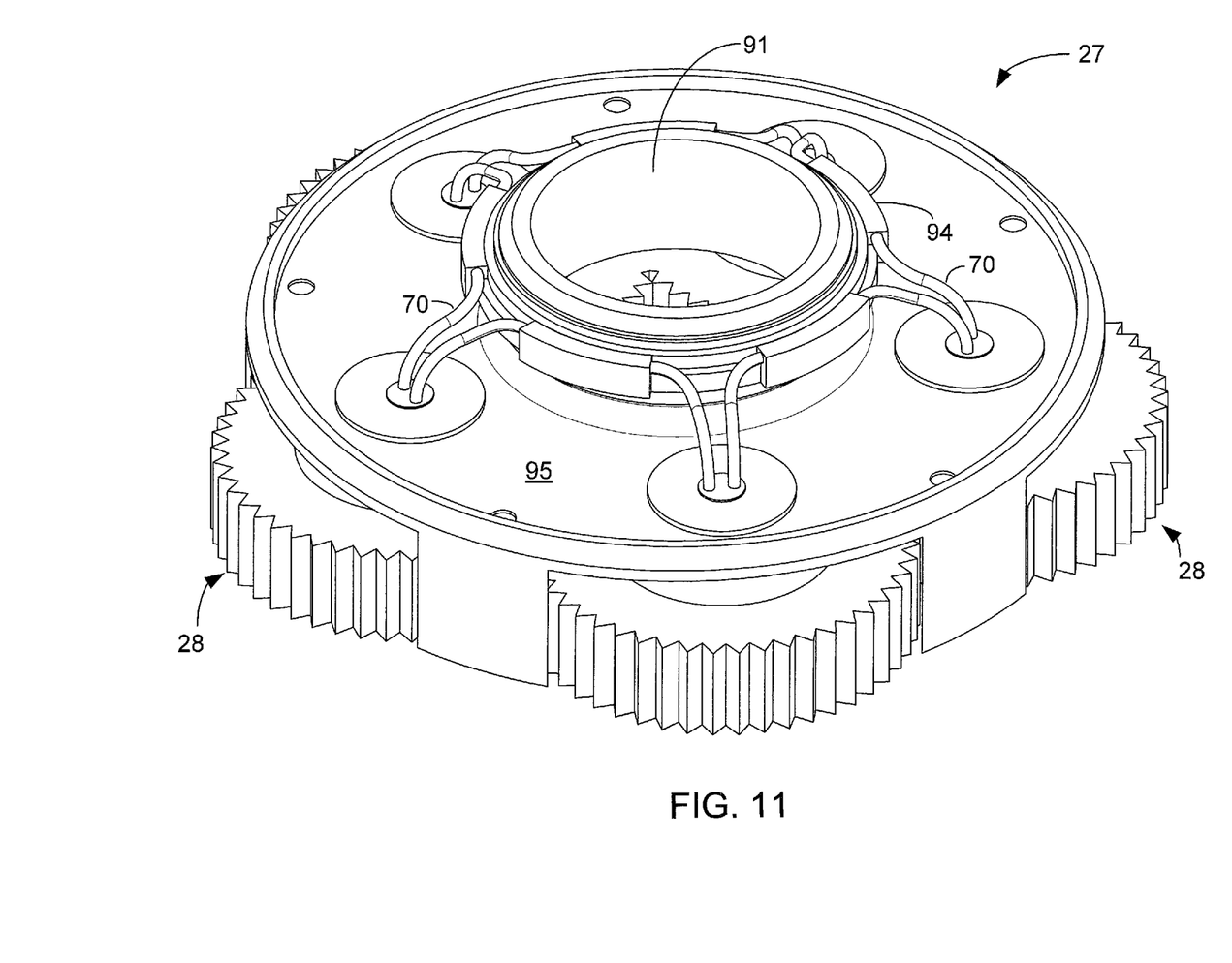
FIG. 11 is an isometric view of the planetary carrier assembly used in the cooling system of FIG. 1.

Referring now also to FIG. 11, planetary carrier assembly 27 is illustrated. As stated previously, heat generated by the gears and bearings is conducted through the steel gears and shafts to heat pipes located in the bore or hollow of the gears or shafts. Heat pipes remove heat from the gear or shaft to the transmission case or directly to the ambient air around transmission 23. Heat pipes 70,80 have been described previously with respect to mandrel assembly 33, a rotating shaft. The cooling system of the present application also includes planetary carrier assembly 27 wherein heat pipes are located within the hollows or bores of planetary pinion gears 28.

Planetary carrier assembly 27 generates a large portion of the heat energy associated with transmission 23. Planetary carrier assembly includes one or more planetary pinions 28, a housing 95, a heat exchanger 94, and a heat pipe 70,80. Planetary carrier assembly 27 is configured to improve heat transfer from internal bearings and improve surface area for convective heat transfer. Planetary pinions 28 are radially aligned in a common plane around a central aperture 91 formed in housing 95. Each planetary pinion 28 has a pinion bore 92 having a pinion axis 93 (see FIG. 6). Planetary pinions 28 are configured to spin about pinion axis 93. Heat pipes 70,80 are integrated into planetary pinion 28 in a coaxial relationship with pinion axis 93. Evaporator region 75,85 are located within pinion bore 92 and condenser region 73,83 are located within heat exchangers 94. Use of heat exchanger 94 increases the surface area for convective heat transfer.

Convective heat exchangers 94 may be located in any number of positions within transmission 23, however, the present application identifies two locations that work well. Heat exchangers 94 are coupled to housing 95 above or below planetary pinions 28 adjacent a convection area. A convection area is an open relatively unobstructed volume of space within transmission 23. Upper convection space 96 and lower convection space 97 are convection areas in transmission 23 (see FIG. 6). As depicted in FIG. 11, heat exchangers 94 are radially positioned about central aperture 91, although other positions or orientations within convection spaces 96,97 are possible. Heat exchangers 94 increase the surface area of the condenser region 73,83 to more efficiently release heat energy.

It is understood that either type of heat pipe 70, 80 may be used with planetary carrier assembly 27. Furthermore, other embodiments of the cooling system may include one or more heat pipes 70,80 embedded within upper housing 26a and/or lower housing 26b. In one embodiment, the evaporator region 75 of the heat pipes 70,80 are within housing 26a,26b walls adjacent upper and/or lower convection space 96,97; while the condenser region 73 is in communication with a heat sink external to the housing of transmission 23. The heat sink could be a supplemental heat exchanger or the ambient air. Such heat pipes are configured to help remove heat from upper and/or lower convective space 96,97. Heat pipes used in the walls of upper and/or lower housing 26a,26b may include heat pipes 70,80 in any other locations.

Figure 12:
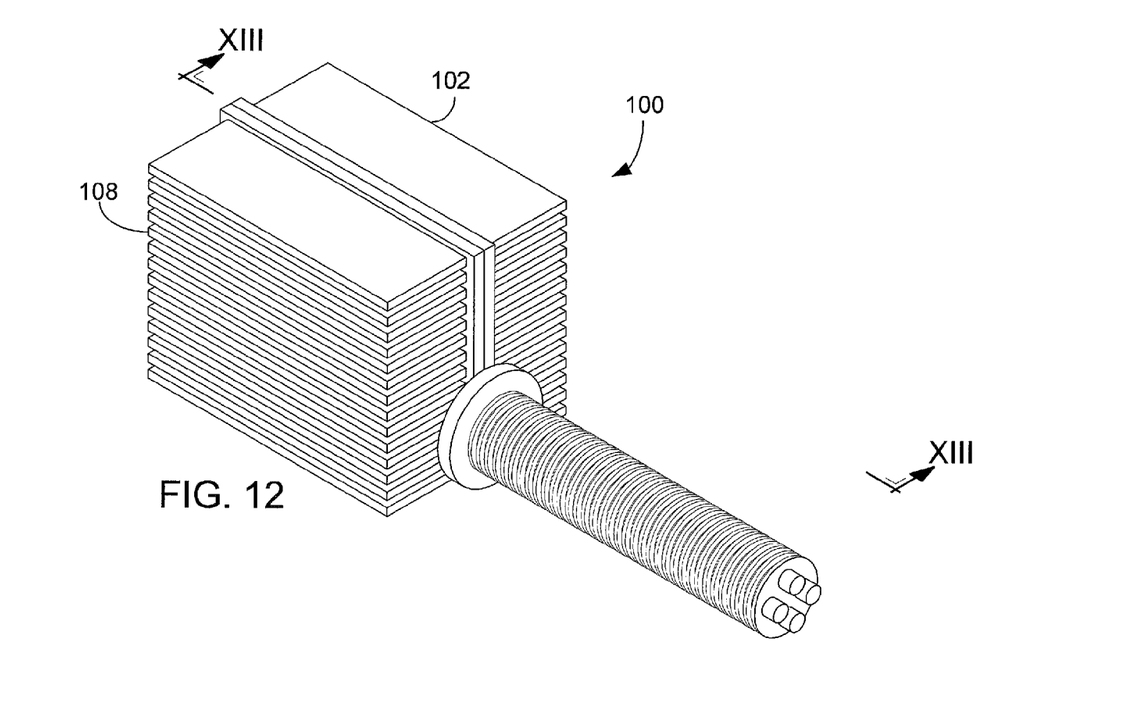
FIGS. 12 and 13 is an isometric view and a partial section view of a supplemental heat exchanger used in the cooling system of FIG. 1.
Figure 13:
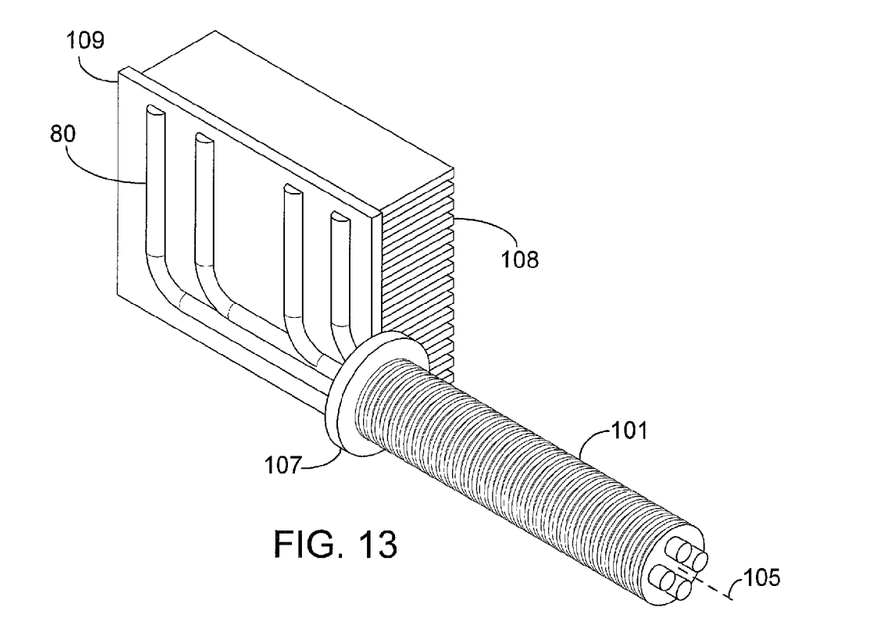

Referring now also to FIGS. 12 and 13 in the drawings, a dipstick heat exchanger 100 is illustrated. The cooling system of the present application may also further include supplemental heat exchangers. It is understood that supplemental heat exchangers may work independently of or in combination with mandrel assembly 33 and planetary carrier assembly 27. Dipstick heat exchanger 100 is a type of supplemental heat exchanger that may be used with transmission 23. Supplemental heat exchangers are a component built to efficiently transfer heat energy, usually incorporating a finned body for increased surface area. Dipstick heat exchanger 100 includes one or more heat pipes 70,80, a cylindrical finned shaft 101, and a supplemental fin structure 102. Shaft 101 defines a central axis 105 extending the length of shaft 101. Shaft 101 includes a pedestal 107 coupled to a face of shaft 101 in a relatively concentric alignment with axis 105. Pedestal 107 separates cylindrical shaft 101 from supplemental fin structure 102. Structure 102 is formed in two halves, although it is understood that structure 102 may be a unitary part in certain embodiments. Structure 102 uses a plate 109 extending along a plane parallel to and adjacent with central axis 105. Fins 108 protrude from plate 109 outward to provide as much surface area as possible to release heat energy. Heat pipes 70,80 are arrayed in a radial pattern within the length of shaft 101 and dispersed within plate 109. The fins of shaft 101 operate to transfer heat energy between heat pipes and to increase the ability of dipstick heat exchanger 100 to absorb heat energy within transmission 23. The two halves of structure 102 are configured to couple together surrounding heat pipes 70,80.

In operation, dipstick heat exchanger 100 is configured to engage portions of transmission 23, such that shaft 101 protrudes through walls of transmission housing 26a,26b and into a heated lubricant, such as oil, or into a heated air space, such as a convection area. Pedestal 107 preferably contacts housing 26a,26b and may, in some embodiments, provide bolt holes to permit dipstick heat exchanger 100 to be secured to transmission 23 via fasteners. The evaporator region 75 of heat pipes 70,80 are located within transmission 23 and the condenser region 73 is located within structure 102. Heat energy is transported from within transmission 23 to an external heat sink through structure 102 via the working fluid in heat pipes 70,80. It is understood that dipstick heat exchanger 100 is removable from transmission 23. Furthermore, other methods of coupling dipstick heat exchanger 100 include the use of external threads around shaft 101, adhesive, and welding to name a few.

Figure 14:
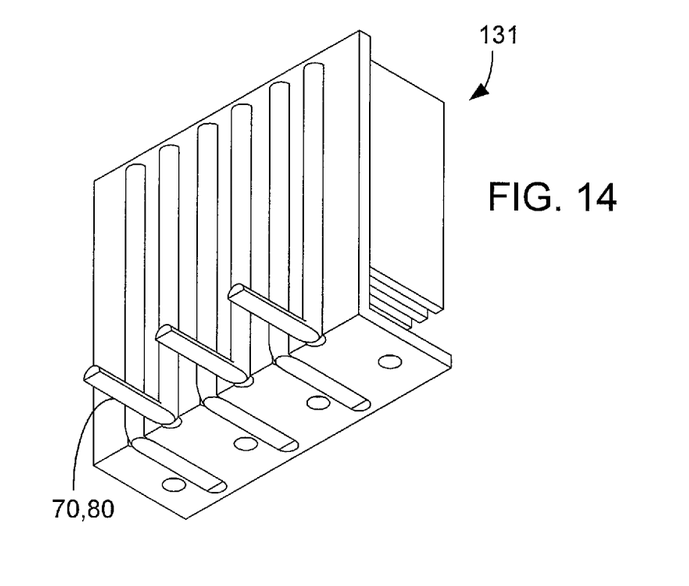
FIGS. 14 and 15 are an isometric view and a partial section view of an alternative embodiment of the supplemental heat exchanger of FIGS. 12 and 13.
Figure 15:
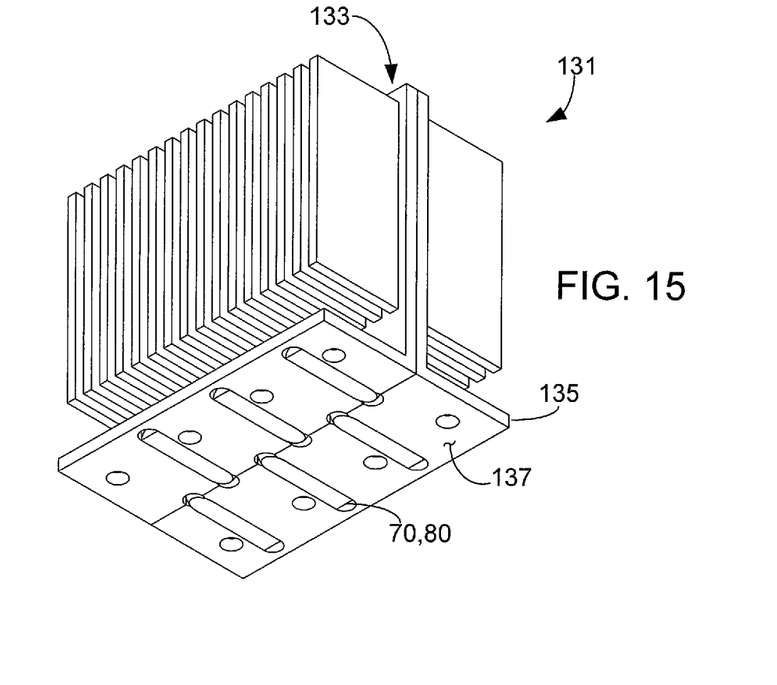

Referring now also to FIGS. 14 and 15 in the drawings, a T-shaped heat sink 131 is illustrated. Heat sink 131 is similar to dipstick heat exchanger 100 in that both are supplemental heat exchangers. Heat sink 131 includes a finned body 133, a pedestal 135, and one or more heat pipes 70,80. T-shaped heat sink 131 is different from dipstick heat exchanger 100 in that heat pipes 70,80 fail to penetrate transmission 23. Finned body 133 is configured to accept the condenser region 73,83 and evaporator region 75 extends toward and is dispersed within pedestal 135. Pedestal 135 bends relatively orthogonally so as to create a generally flat base plane 137. Heat sink 131 is configured to couple externally to a portion of housing 26a,26b by using fasteners to secure base plane 137 to an external surface. It is understood that base plane 137 may be configured to take a plurality of shapes depending on the mating surface. Furthermore, other methods of securing heat sink 131 to the mating surface may be employed, namely, adhesive for example.

It is understood that any devices, components, items, or parts described above with any and all of the associated embodiments may be used with respect to transmission 23 and other portions of the drivetrain of the aircraft. Furthermore, the cooling system of the present application may interchange and be composed of any and all of the devices, components, items, or parts described previously. Additionally, the cooling system of the present application may be used to cool engines and transmissions in static ground environments; such as pumps, test stands, and industrial equipment resting on the ground; or in automotive applications with respect to automotive drivetrains.

The current application has many advantages over the prior art including the following: (1) not requiring a separate oil system that is non-functional until an emergency lubrication event occurs; (2) assist in the removal of heat during normal flight operation, so as to reduce the required heat removal capacity of the primary lubrication system; (3) increased efficiency at transferring heat out of a transmission; (4) decrease the weight of lubricant and decrease the lubricant reserves required.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A system for transferring heat, comprising:
   a mandrel assembly, having:
      a rotating body defining a central axis, the body having a first end and a second end;
      a channel formed within the rotating body between the first end and the second end, the channel being angled with respect to the central axis in a non-coaxial relationship; and
      a heat pipe configured to transfer heat from the first end to the second end as the body rotates about the central axis, the heat pipe located within the channel;
   a planetary carrier assembly having:
      a second heat pipe integrated into a planetary pinion, the planetary carrier assembly being configured to engage a main rotor mast of an aircraft and rotate about a pinion axis;
      wherein the second heat pipe is configured to transfer heat energy from the planetary pinion to a convective heat exchanger in communication with a convection area; and
      wherein centrifugal forces assist in the movement of working fluid within the heat pipe as the rotating body is rotated.

2. The system of claim 1, wherein the heat pipe is a rotating heat pipe.

3. The system of claim 1, wherein the heat pipe has parallel internal walls.

4. The system of claim 3, wherein the heat pipe uses a wick to assist in the movement of the working fluid.

5. The system of claim 1, further comprising:
   a condenser fan axially aligned with the central axis and configured to create a heat sink by generating convective air flow over the second end.

6. The system of claim 1, wherein the heat pipe removes heat from gears and bearings during a loss of lubrication event.

7. A cooling system for removing heat from a transmission of an aircraft, the cooling system comprising:
   a mandrel assembly configured to rotate about a central axis, the mandrel assembly having:
      a rotating body;
      a channel formed within the rotating body for housing a heat pipe, the heat pipe oriented in a non-coaxial relationship with the central axis; and a condenser configured to generate convective airflow over the heat pipe to condense the working fluid, the condenser having a central aperture for accepting a portion of the rotating body; and a planetary carrier assembly having a second heat pipe integrated into a planetary pinion, the planetary carrier assembly being configured to engage a main rotor mast of the aircraft and rotate about a pinion axis;

wherein the second heat pipe is configured to transfer heat energy from the planetary pinion to a convective heat exchanger in communication with a convection area; and wherein working fluid within the heat pipe uses centrifugal forces to move between a condenser region to an evaporator region of the heat pipe as the rotating body is rotated.

8. The cooling system of claim 7, wherein the cooling system is configured to remove heat from the transmission of the aircraft independent of a primary lubrication system.

9. The cooling system of claim 7, wherein the cooling system is configured to remove heat from the transmission of the aircraft during a loss of lubrication event sufficient to prevent failure of the transmission of the aircraft for a selected duration.

10. The cooling system of claim 7, further comprising a third heat pipe embedded within a housing of the transmission.

11. The cooling system of claim 7, further comprising:

a supplemental heat exchanger configured to penetrate a housing of the transmission, the supplemental heat exchanger using a second heat pipe to transfer heat energy.

12. The cooling system of claim 7, wherein the cooling system maintains manageable flight operations of the aircraft for a selected duration during a loss of a lubrication event.

* * * * *